(12) United States Patent
Oh

(10) Patent No.: US 10,095,527 B2
(45) Date of Patent: *Oct. 9, 2018

(54) METHOD FOR MANAGING DEVICE AND ELECTRONIC DEVICE SUPPORTING THE SAME

(71) Applicant: Samsung Electronics Co., Ltd., Gyeonggi-do (KR)

(72) Inventor: Sung Jo Oh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,676

(22) Filed: Jul. 27, 2016

(65) Prior Publication Data
US 2017/0031692 A1 Feb. 2, 2017

(30) Foreign Application Priority Data
Jul. 27, 2015 (KR) .......... 10-2015-0106132

(51) Int. Cl.
| G06F 3/00 | (2006.01) |
| G06F 9/4401 | (2018.01) |
| G06F 9/54 | (2006.01) |
| G06F 9/455 | (2018.01) |
| G06F 21/30 | (2013.01) |
| G06F 21/60 | (2013.01) |
| H04W 4/50 | (2018.01) |

(52) U.S. Cl.
CPC ........ *G06F 9/4406* (2013.01); *G06F 9/45558* (2013.01); *G06F 9/541* (2013.01); *G06F 21/305* (2013.01); *G06F 21/604* (2013.01); *H04W 4/50* (2018.02); *G06F 2009/4557* (2013.01); *G06F 2009/45579* (2013.01); *G06F 2009/45587* (2013.01)

(58) Field of Classification Search
CPC ...................................................... G06F 9/541
USPC ......................................................... 719/319
See application file for complete search history.

(56) References Cited

U.S. PATENT DOCUMENTS

| 2006/0184938 A1* | 8/2006 | Mangold ............... G06F 9/5016 718/1 |
| 2008/0127088 A1* | 5/2008 | Harmsen ................... G06F 8/60 717/121 |
| 2010/0287455 A1* | 11/2010 | Tripathi ............... G06F 9/45558 714/807 |
| 2011/0154325 A1* | 6/2011 | Terasaki .................. G06F 9/455 718/1 |

(Continued)

OTHER PUBLICATIONS

Natasha Gude, Nox: Towards and Operating System for Networks, Jul. 2008.*

*Primary Examiner* — Lechi Truong
(74) *Attorney, Agent, or Firm* — Cha & Reiter, LLC.

(57) ABSTRACT

A device management method including receiving, at an electronic device including a first operating system and a second operating system, a policy for the first or second operation system from an external server by a device management module of the first operating system, sending, by the device management module, the policy to a host management module of the first operating system in communication with the second operating system, and applying, by the host management module, the policy to the second operating system.

14 Claims, 11 Drawing Sheets

(56) References Cited

U.S. PATENT DOCUMENTS

| | | | |
|---|---|---|---|
| 2012/0174097 A1* | 7/2012 | Levin | G06F 9/5077 718/1 |
| 2013/0074072 A1* | 3/2013 | Kennedy | G06F 9/44505 718/1 |
| 2014/0280913 A1 | 9/2014 | Karren et al. | |

* cited by examiner

METHOD FOR MANAGING DEVICE AND ELECTRONIC DEVICE SUPPORTING THE SAME

CLAIM OF PRIORITY

This application claims the benefit under 35 U.S.C. § 119(a) of a Korean patent application filed on Jul. 27, 2015 in the Korean Intellectual Property Office and assigned Serial number 10-2015-0106132, the entire disclosure of which is hereby incorporated by reference.

TECHNICAL FIELD

The present disclosure relates to a method for managing a security policy at an electronic device capable of running a plurality of operating systems and an electronic device supporting the same.

BACKGROUND

An electronic device such as a smartphone, a tablet, or the like may perform various functions by using applications. Hardware specifications and optimization performance have been improving as technology associated with these electronic devices is being developed. For example, increasingly these electronic device have been able to run a plurality of operating systems.

Bring your own device (BYOD) is an increasing trend, in particular in business communities, and refers to the policy of permitting users (e.g., employees) to bring personally owned mobile devices (e.g., laptops, tablets, and smart phones) for use in the employer's network environment so that the employees' personal devices can access confidential company information and applications. For this reason, technology is being developed for using these electronic devices as virtual machines (VM) so that the electronic devices can access the employer's data in a secure manner. The VM may support a second operating system on the electronic device so that the user can access confidential data only when the electronic device is running the second operating system. Accordingly, software on the electronic device may be segregated into business and personal areas.

In the case where a conventional electronic device runs a plurality of operating systems, the operating systems may operate independently of each other. For this reason, each operating system may separately receive a security policy from an external server.

SUMMARY

Aspects of the present disclosure are to address at least the above-mentioned problems and/or disadvantages and to provide at least the advantages described below. Accordingly, an aspect of the present disclosure is to provide a device management method that allows an electronic device, which operates a plurality of operating systems by using a hypervisor, to provide a security policy received through one operating system to any other operating system(s) for unified security management and an electronic device supporting the same.

In accordance with an aspect of the present disclosure, there is provided a device management method including receiving, at an electronic device including a first operating system and a second operating system, a policy for the first or second operation system from an external server by a device management module of the first operating system, sending, by the device management module, the policy to a host management module of the first operating system in communication with the second operating system, and applying, by the host management module, the policy to the second operating system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
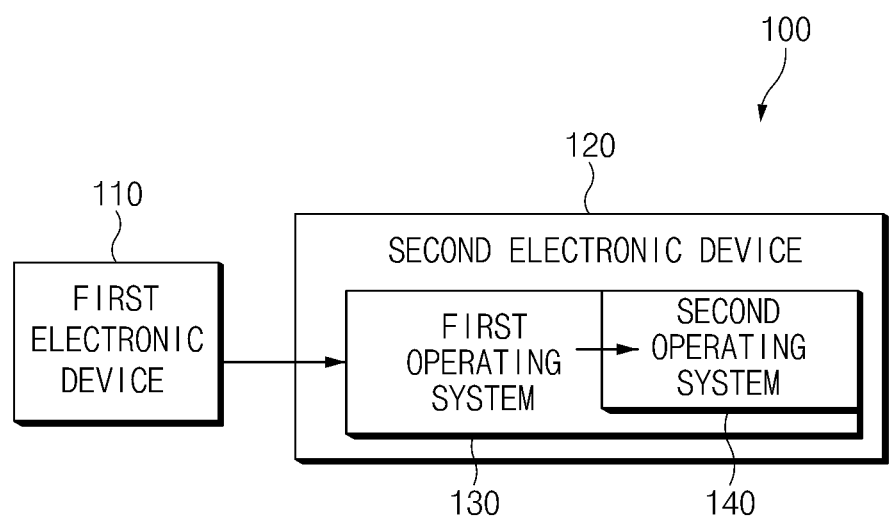
FIG. 1 illustrates an electronic device in a network environment according to one embodiment of the present disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include"

and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to one embodiment of the present disclosure.

Referring to FIG. 1, a network environment 100 may include a first electronic device (e.g., a device management server) 110 and a second electronic device 120.

The first electronic device 110 may provide a policy (e.g., a security policy) for controlling functions that the second electronic device 120 executes. For example, the first electronic device 110 may send a policy for requesting the second electronic device 120 to restrict a camera function of the second electronic device 120. In one embodiment, the policy may include 1) a policy associated with a control of hardware resources such as a control of input/output devices or a control of storage devices of the second electronic device 120 or 2) a non-hardware related security policy such as a password policy of inducing a user to use a password of a specific level, an e-mail policy of enforcing a rule, such as an e-mail period in a user's community, or the like.

According to an embodiment, the second electronic device 120 may provide one operating system (e.g., the first operating system 130) with a security policy for executing functions and may not provide another operating system (e.g., the second operating system 140) with a separate security policy.

According to an embodiment, the first electronic device 110 may provide the second electronic device 120 with a security policy for control of networks, control of device drivers (e.g., PCMCIA, BT, USB, IrDA, and the like), control of ports (e.g., COM, LPT, and the like), control of storage devices (e.g., FDD, CD/DVD-ROM, USB, Network Drive, and the like), device security management (e.g., a shared folder, a system password, an account, network settings, a firewall, power management, whether anti-virus software is used, power management, and the like), control of applications (e.g., app installation, deletion, and management (Blacklist, whitelist, and the like)), control of content (e.g., content installation, deletion, management, and the like), and any other system control that are associated with the second electronic device 120.

The second electronic device 120 may operate a plurality of operating systems (e.g., the first operating system 130 and the second operating system 140). According to an embodiment, the second electronic device 120 may be provided with a policy (e.g., a security policy from the first electronic device 110) for controlling functions executable on the second electronic device 120 and may control the execution of the functions based on the policy. For example, the second electronic device 120 may restrict the execution of its camera function based on the policy from the first electronic device 110.

The second electronic device 120 may operate the operating systems by using the hypervisor, also called a virtual machine manager in the art. Like server virtualization, the hypervisor may operate two separate operating systems on the second electronic device 120 so that, even though second electronic device 120 is a single physical device, second electronic device 120 can appear to be two distinct terminals, depending on which operating system is currently running. The hypervisor may be installed between the kernel (hardware) and the operating system (Type-1) or on a host operating system (Type-2).

According to one embodiment, in the case where type-2 scheme is applied to the second electronic device 120, the hypervisor may be installed based on the first operating system 130, and the second operating system 140 may be driven through the hypervisor.

According to an embodiment, after receiving the policy from the first electronic device 110, the first operating system 130 may send the policy to the second operating system 140 through modules therein and described below. Since the second operating system 140 does not need to receive a separate policy from the first electronic device 110, the second electronic device 120 may be managed uniformly and efficiently.

Below, embodiments will be described under the assumption that the first electronic device 110 is a device management server, the second electronic device 120 operates the first operating system 130 as a host operating system and the second operating system 140 as a guest operating system. However, these conditions are exemplary only for the purposes of explaining the various embodiments of the present disclosure and embodiments of the present disclosure are not limited thereto.

Figure 2:
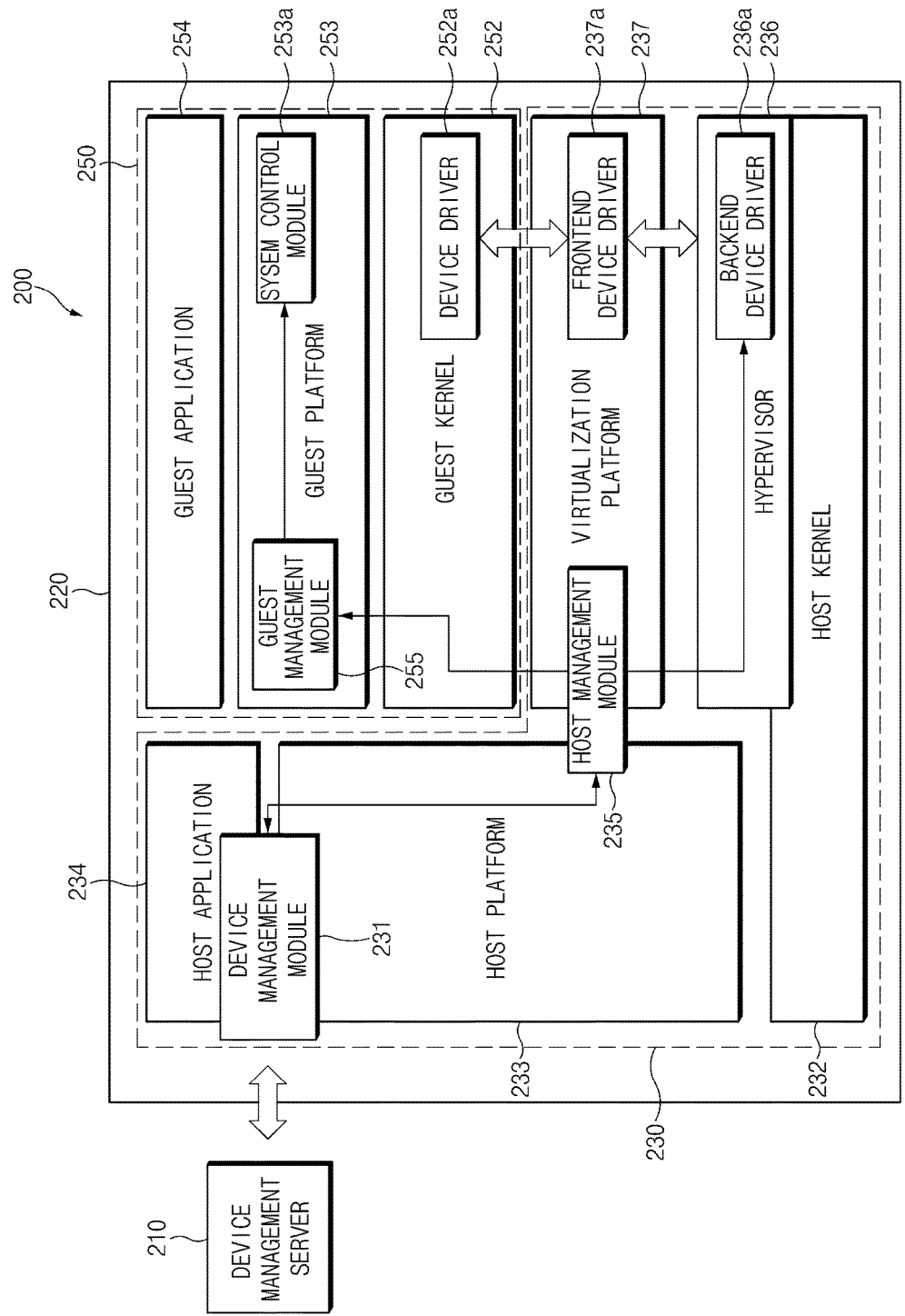
FIG. 2 illustrates an electronic device that runs a host operating system and a guest operating system, according to one embodiment of the present disclosure.

FIG. 2 illustrates an electronic device that runs a host operating system and a guest operating system, according to one embodiment of the present disclosure.

Referring to FIG. 2, an electronic device 220 may run a host operating system 230 and a guest operating system 250. The host operating system 230 and the guest operating system 250 in turn may be platforms for running independent applications.

According to an embodiment, the host operating system 230 may be installed before the guest operating system 250 is installed. A hypervisor 236 may be driven based on a kernel (or host kernel) 232 of the host operating system 230. The guest operating system 250 may be virtualized and be running through the hypervisor 236 (i.e. hypervisor Type-2 explained above).

In FIG. 2, an exemplary embodiment is shown where the electronic device 220 includes one guest operating system 250. However, embodiments are not limited thereto. The case where the electronic device 220 includes a plurality of guest operating systems will be described with reference to FIG. 8.

According to an embodiment, the host operating system 230 may be provided with the security policy from a device management server 210. On the basis of the security policy, the host operating system 230 may control various devices or modules in the electronic device 220 and the execution of an application function. Furthermore, in the case where the security policy targets the guest operating system 250, the host operating system 230 may provide the security policy to the guest operating system 250.

The host operating system 230 may include a device management module 231, a host kernel 232, a host platform 233, a host application 234, a host management module 235, the hypervisor 236, and a virtualization platform 237.

The device management module 231 may control communications with the device management server 210 and may receive the security policy to start the control and management operations of the host operating system 230 according to the received security policy. The device management module 231 may provide the received security policy to the host platform 233 in the host operating system 230.

The host kernel 232 may manage system resources and device drivers. The host kernel 232 may provide a platform for the hypervisor 236. The host platform 233 may further provide an environment for running applications on the electronic device 220. According to one embodiment, the host platform 233 may include a framework and a library.

The host application 234 may be an application running in the host operating system 230.

According to an embodiment, the host management module 235 may control virtual hardware resources (e.g., disable an input/output device or storage device in the guest operating system 250) or may provide some software control (e.g., a non-hardware related security policy such as a password policy) to a guest management module 255 of the guest operating system 250, based on the security policy received through the device management module 231. By doing so, the host management module 235 can control access and security of the guest operating system 250 according to the received security policy from device management server 210.

According to an embodiment, the host management module 235 may directly control device drivers through the hypervisor 236 and the virtualization platform 237 according to a policy associated with a hardware resource such as a control of an input/output device, a control of a storage device, or the like.

The host management module 235 may control a backend device driver 236a of the virtualization platform 237 according to a policy associated with a control of an input/output device or a control of a storage device. As such, the host management module 235 may limit the guest operating system 250's access to certain hardware. The host management module 235 may control a designated device driver so that the guest operating system 250 that recognizes that the corresponding device is physically removed or is disabled.

According to one embodiment, the host management module 235 may prevent the guest operating system 250 from recognizing a designated device driver by restricting the function of the designated device driver of the guest operating system 250 (e.g., restricting the storage device to be read-only) or setting the designated device driver to an non-existence state, so that the guest operating system 250 recognizes that the device is disabled. In an embodiment, in the case where a device driver of the host operating system 230 is switched into a disabled state, the host management module 235 may automatically switch the corresponding device driver of the guest operating system 250 into a disabled state.

The hypervisor 236 may drive the virtualization platform 237 for installation of the guest operating system 250. The hypervisor 236 may be installed based on the host kernel 232. The hypervisor 236 may include the backend device driver 236a. The backend device driver 236a may virtualize a physical device driver so that the physical device driver communicates with the frontend device driver 237a in the virtualization platform 237.

The virtualization platform 237 may operate based on the hypervisor 236, and the guest operating system 250 may be installed thereon. The virtualization platform 237 may include the frontend device driver 237a. The frontend device driver 237a may communicate with the backend device driver 236a in the hypervisor 236. The frontend device driver 237a may notify a virtual device driver 252a of the guest operating system 250 that a device is removed or is set to a disabled state when the host management module 235, for example, controls backend device driver 236a of the virtualization platform 237 according to the received security policy.

The guest operating system 250 may operate based on the virtualization platform 237. The guest operating system 250 may include a guest kernel 252, a guest platform 253, a guest application 254, and a guest management module 255.

The guest kernel 252 may include the virtual device driver 252a. The virtual device driver 252a may communicate with the frontend device driver 237a of the virtualization platform 237.

The guest platform 253 may provide an environment for driving applications. The guest platform 253 may include a framework and a library. In one embodiment, the guest platform 253 may include a system control module 253a.

The guest application 254 may be an application, for example an e-mail application, running in the guest operating system 250.

According to an embodiment, the guest management module 255 may receive the non-hardware related security policy (e.g., a password policy) from the host management module 235.

According to an embodiment, the guest management module 255 may convert the received security policy into a form suitable for the guest operating system 250 and may provide the converted security policy to the system control module 253a in the guest platform 253. The system control module 253a may perform various system controls based on the received security policy.

According to an embodiment, the guest management module 255 may convert the non-hardware related security policy (e.g., a password policy) into a form suitable for the guest operating system 250 and may provide the converted policy to the system control module 253a. The guest management module 255 may provide the received security policy to the system control module 253a.

Figure 3:
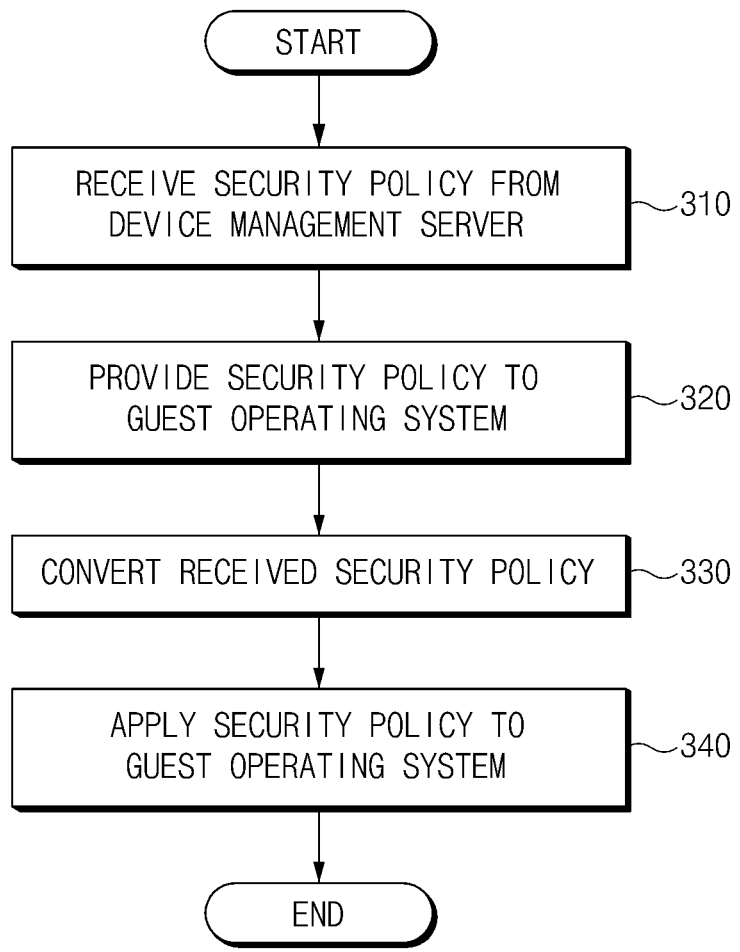
FIG. 3 is a flowchart illustrating a device management method according to one embodiment of the present disclosure.

FIG. 3 is a flowchart illustrating a device management method according to one embodiment of the present disclosure.

Referring to FIG. 3, in operation 310, the device management module 231 may receive a security policy from the device management server 210 or according to a user setting. According to an embodiment, the electronic device 220 may apply the security policy received through the device management module 231 to both the host operating system 230 and the guest operating system 250. According to an embodiment, the electronic device 220 may apply the security policy received through the device management module 231 to at least one of the host operating system 230 or the guest operating system 250 based on the security policy.

The guest operating system 250 may not be separately connected with the device management server 210 and may receive the security policy through the host operating system 230. According to another embodiment, the guest operating system 250 instead may receive the security policy and the host operating system 230 may be provided with the security policy through the guest operating system 250 such that the host operating system 230 is not connected with the device management server 210.

According to an embodiment, the electronic device 220 may apply a security policy, which is sent to the host operating system 230, to the guest operating system 250. For example, if a camera function is restricted by the security policy so that in the host operating system 230, the camera is disabled, the same security policy may be applied to the guest operating system 250.

The device management module 231 may provide the received security policy to the host platform 233 of the host operating system 230. According to one embodiment, the device management module 231 may call an application programming interface (API) of a device management (DM)

framework that control the host operating system 230. The DM framework may store the security policy in database therein.

According to one embodiment, the device management module 231 may broadcast contents of the received security policy to modules (e.g., the host management module 235) associated with the security policy included in the electronic device 220 such that the modules perform operations according to the security policy.

In operation 320, the host management module 235 may provide the security policy associated with the guest operating system 250 to the guest management module 255 of the guest operating system 250.

For example, in the host operating system 230, if DRM function is turned on and file system encryption is switched to be enabled based on the security policy, the host management module 235 may provide the security policy to the guest operating system 250 to allow the guest operating system 250 to perform the DRM function and the file system encryption.

As another example, if a policy in which the operation of the guest operating system 250 is restricted when a designated anti-virus software does not exist is received, the host management module 235 may provide the policy to the guest operating system 250 such that the policy is applied to the guest operating system 250.

According to one embodiment, in the case where the received policy is associated with a system control or device security management, the host management module 235 may request the guest management module 255 to transmit a response through a shared memory.

In operation 330, the guest management module 255 of the guest operating system 250 may convert the security policy received from the host management module 235 into a form suitable for the guest operating system 250. The guest management module 255 may be installed at the same time as when the guest operating system 250 is installed.

In operation 340, the guest management module 255 may provide the converted security policy to the system control module 253a in the guest platform 253 such that the converted security policy is applied to the guest operating system 250.

The guest management module 255 may request the system control module 253a to execute a command (CMD) or may perform API call and transmission. As part of the process to convert the security policy into a form suitable for the guest operating system 250, the guest management module 255 may map the security policy or a portion thereof to appropriate commands CMD or API calls of the guest operating system 250. The guest management module 255 may then call the system control module 253a using the mapped commands or APIs, such that a system control operation may be performed at the guest operating system 250.

The system control module 253a may be a default module included in the guest platform 253. The system control module 253a may perform various controls based on the received security policy. For example, the system control module 253a may perform a role similar to that of the control panel in the Windows operating system or System Preferences of the Mac OS operating system.

Figure 4:
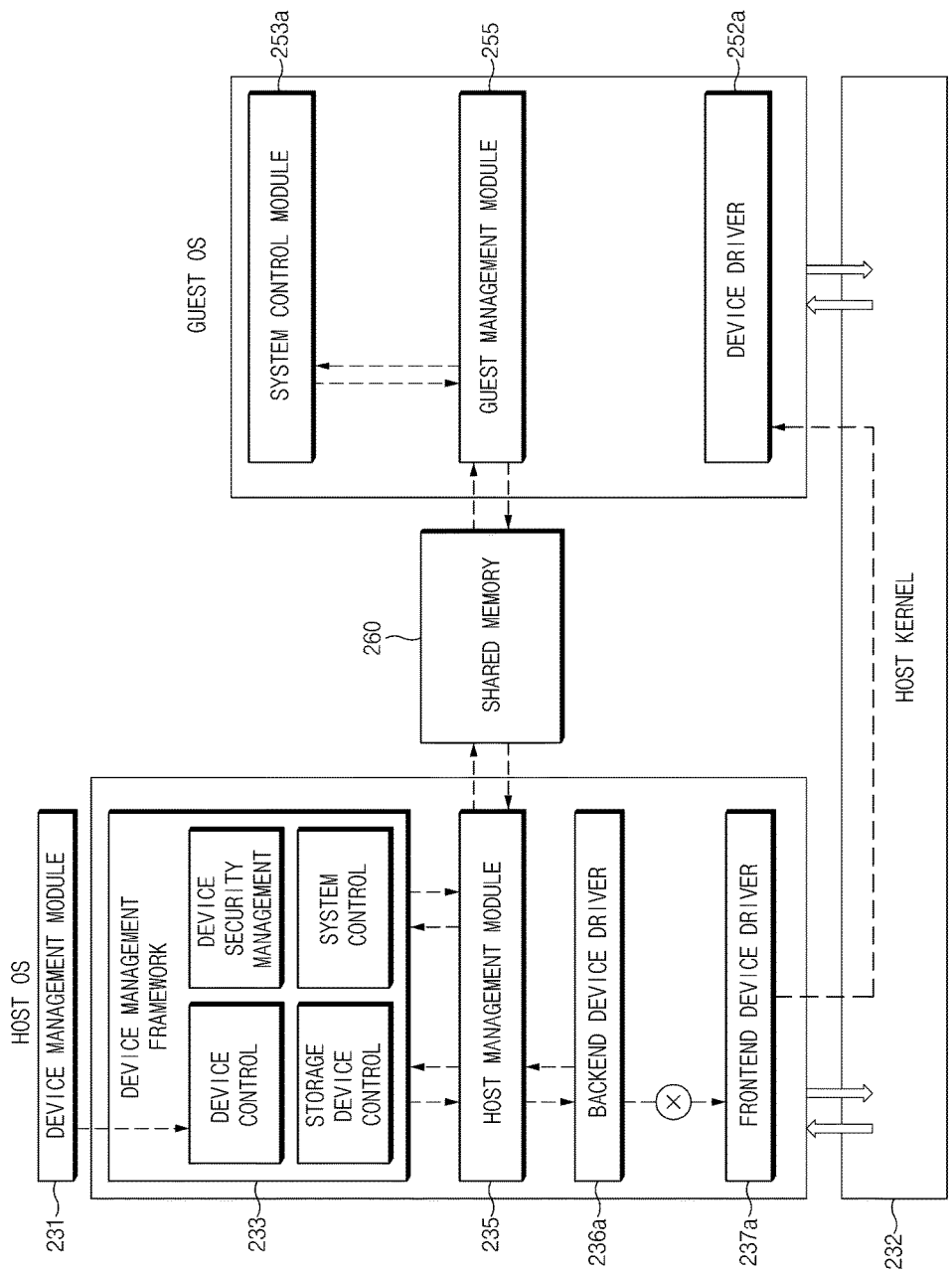
FIG. 4 illustrates an information flow diagram of the security policy, according to one embodiment of the present disclosure.

FIG. 4 illustrates an information flow diagram of the security policy, according to one embodiment of the present disclosure.

Referring to FIG. 4, the device management module 231 may receive a security policy from the device management server 210 or through a user setting. The device management module 231 may call the API of the DM framework 233a that controls the host operating system 230.

The host management module 235 may store the security policy associated with the guest operating system 250 in the shared memory 260. The shared memory 260 may be a storage device that both the host management module 235 and the guest management module 255 can access. The host management module 235 may store data associated with the security policy in a designated area of the shared memory 260 in a predefined format.

The guest management module 255 may load the stored security policy from the shared memory 260. The guest management module 255 may then convert the loaded security policy into a form suitable for the guest operating system 250 and may provide the converted security policy to the system control module 253a.

According to one embodiment, the host management module 235 may directly control the backend device driver 236a of the virtualization platform 237 to apply the security policy associated with control of an input/output device, a storage device, or other hardware of the electronic device 220.

The backend device driver 236a may send information, such as an indication that the device is removed or is set to a disabled state, to the frontend device driver 237a under control of the host management module 235.

The virtual device driver 252a then recognizes that the device is removed or is set to a disabled state, based on the information from the frontend device driver 237a.

Accordingly, the host management module 235 may limit hardware access of the guest operating system 250 such that the guest operating system 250 recognizes a designated device driver is removed or is disabled.

Figure 5:
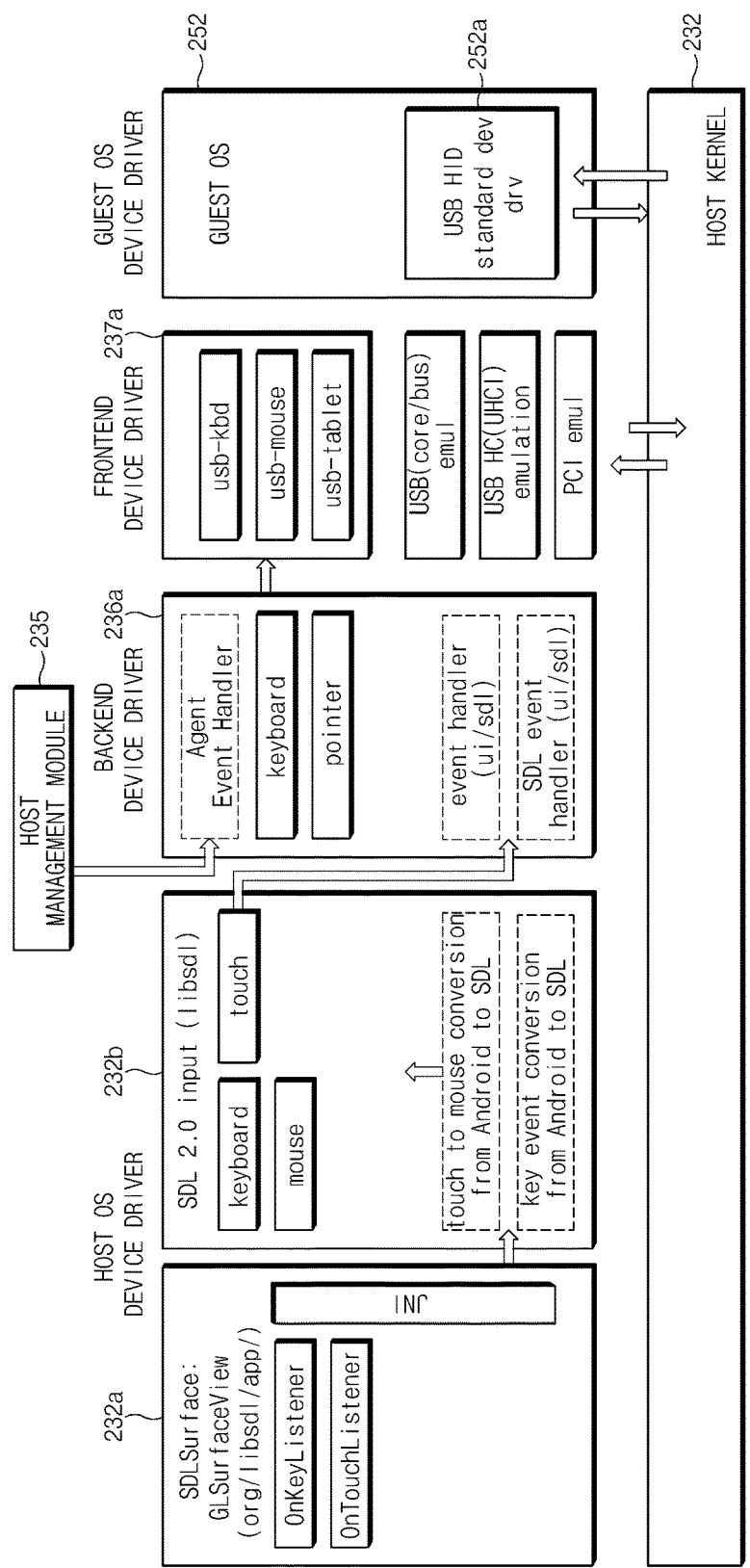
FIG. 5 illustrates an exemplary information flow diagram for a control of an input device, according to one embodiment of the present disclosure.

FIG. 5 illustrates an exemplary information flow diagram for a control of an input device, according to one embodiment of the present disclosure.

Referring to FIG. 5, each of device drivers 232a and 232b may verify input information and connections of various input devices (e.g., a touch panel, a keyboard, a mouse, and the like) of the electronic device 220. The device drivers 232a and 232b may be connected to the backend device driver 236a.

The backend device driver 236a may virtualize a physical device driver and may connect the virtualized device driver to the frontend device driver 237a.

The host management module 235 may directly control the backend device driver 236a with regard to a policy associated with a control of an input/output device. For example, to restrict access to a hardware device, the backend device driver 236a may provide the frontend device driver 237a with information indicating that an input device (e.g., a touch panel, a keyboard, or a mouse) is removed or is set to a disabled state, under control of the host management module 235.

In this scenario, the frontend device driver 237a may notify a virtual device driver 252a of the guest operating system 250 that the input device (e.g., a touch panel, a keyboard, or a mouse) is removed or is set to a disabled state. Accordingly, the host management module 235 restricts the guest operating system 250 from using a designated input device (e.g., a touch panel, a keyboard, or a mouse).

Figure 6:
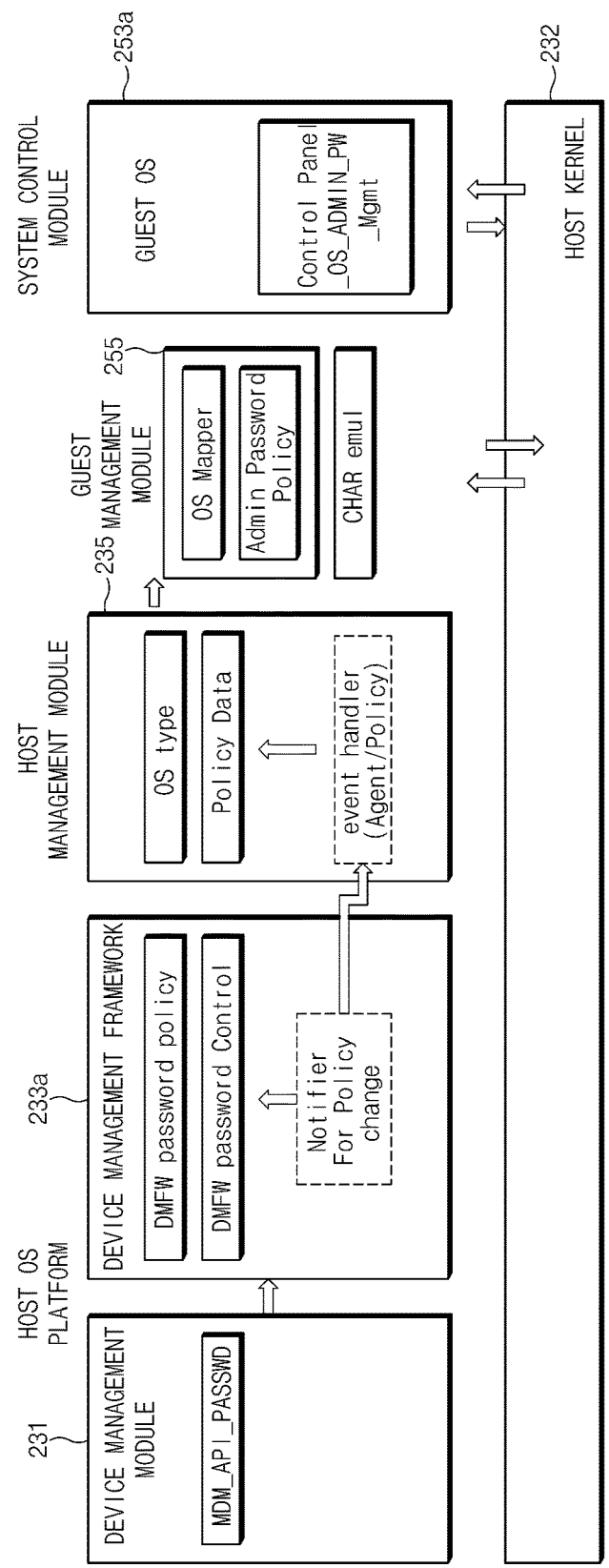
FIG. 6 illustrates an information flow diagram for a system control, according to one embodiment of the present disclosure.

FIG. 6 illustrates an information flow diagram for a system control, according to one embodiment of the present disclosure. In FIG. 6, there is illustrated an example in which a password policy is used. However, the embodiments of the present disclosure are not limited thereto. A description associated with the application of the password policy may be applied to the non-hardware related security policy, such as a policy associated with a software control.

Referring to FIG. 6, the device management module 231 may receive information about the password policy from the device management server 210. For example, the password policy may include the following conditions: 1) the user must set a password for locking and unlocking the electronic device 220, 2) the user must create a password that is a string of eight or more non-repeating letters including at least one or more English letters, at least one or more numbers, and at least one or more specific letters, and 3) the user must replace the password at least once a month.

The device management module 231 may call an API that is associated with the password policy of the device management framework 233a in the host operating system 230.

The host management module 235 may provide information about the password policy to the guest management module 255 of the guest operating system 250.

The guest management module 255 may convert the password policy information received from the host management module 235 into a form suitable for the guest operating system 250.

The guest management module 255 may provide the converted password policy information to the system control module 253a of the guest platform 253 such that the password policy information is applied to the guest operating system 250.

Figure 7:
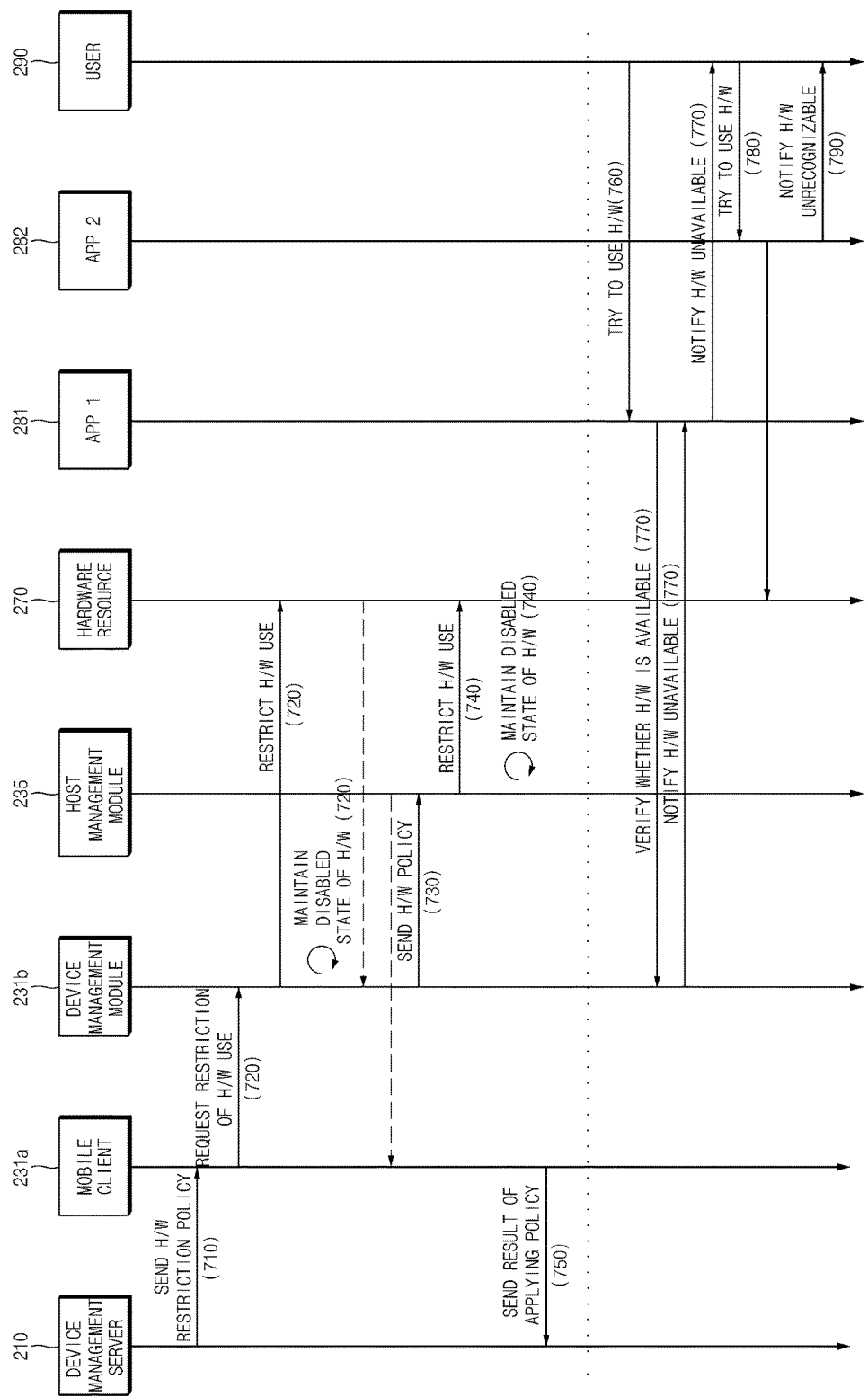
FIG. 7 is a signal flow diagram for describing a device management process, according to one embodiment of the present disclosure.

FIG. 7 is a signal flow diagram for describing a control of hardware resources, according to one embodiment of the present disclosure.

Referring to FIG. 7, in operation 710, the device management server 210 may send a security policy for restricting the execution of a designated hardware resource (e.g., a camera device) 270 to the host operating system 230.

In operation 720, the host operating system 230 may set to restrict the use of a hardware resource (e.g., the camera device) 270 based on the security policy. The restriction may be in the form of a use restriction request, a maintenance of a disabled state, a verification of a disabled state, etc. In one embodiment, the host operating system 230 may provide the security policy to a device management module 231b through a mobile client 231a that is executed by the host application 234.

In operation 730, the host management module 235 may provide the security policy to the guest operating system 250 to apply the security policy to the guest operating system 250.

In operation 740, the host management module 235 may directly control the hardware resource 270 and may maintain a disabled state for the hardware resource 270. In this case, the guest operating system 250 may recognize that the hardware resource 270 is removed.

In operation 750, the host operating system 230 may notify the device management server 210 of a restriction result of the hardware resource 270.

Below, there will be described a signal flow diagram in the case where the host operating system 230 and the guest operating system 250 execute applications thereof respectively while the use of the hardware resource (e.g., the camera device) 270 is restricted at the host operating system 230 and the guest operating system 250 (operations 760 to 790).

In operation 760, a user 290 may try to use the hardware resource 270 by using a first application 281 that operates on the host operating system 230.

In operation 770, the first application 281 may determine whether the hardware resource 270 is available to use, and the host operating system 230 may respond to the first application 281. The first application 281 may notify the user 290 that the hardware resource 270 is unavailable to use.

In operation 780, the user 290 may try to use the hardware resource 270 by using a second application 282 that operates on the guest operating system 250.

In operation 790, the second application 282 may notify the user 290 that the hardware resource 270 is unrecognizable, thereby also preventing the user from accessing the hardware resource 270.

According to one embodiment, a device management method may include receiving, at an electronic device including a first operating system and a second operating system, a policy for the first or second operation system from an external server by a device management module of the first operating system, sending, by the device management module, the policy to a host management module of the first operating system in communication with the second operating system, and applying, by the host management module, the policy to the second operating system.

According to one embodiment, the applying the security policy to the second operating system may include when the policy applies to a hardware device of the electronic device, setting, by the host management module, a device driver coupled to a virtual device driver of the second operating system.

According to one embodiment, the applying of the policy to the second operating system may include controlling, by the host management module, a backend device driver of a hypervisor installed on a kernel of the first operating system. The applying of the policy to the second operating system may include notifying, by the backend device driver, a frontend device driver corresponding to the backend device driver that a hardware device of the electronic device is removed or is in a disabled state. The applying of the policy to the second operating system may include notifying, by the frontend device driver, a virtual device driver of the second operating system that the hardware device of the electronic device is removed or is in a disabled state.

According to one embodiment, the setting of the device driver may include restricting, by the host management module, a function of the virtual device driver of the second operating system through a hypervisor installed on a kernel of the first operating system.

According to one embodiment, the setting of the device driver may include automatically switching the virtual device driver into a disabled state when a corresponding device driver of the first operating system is switched into the disabled state.

According to one embodiment, the applying of the policy to the second operating system may include, when the policy applies to a software control of the second operating system, providing, by the host management module, at least a part of the policy to a guest management module in the second operating system. The method may further converting, by the guest management module, the at least a part of the policy, and applying the converted policy by a system control module in the second operating system.

According to one embodiment, the converting of the at least a part of the policy may include mapping, by the guest management module, the at least a part of the policy into a command or application programming interface (API) call of the second operating system and providing a result of the mapping to the system control module in the second operating system.

According to one embodiment, the device management method further includes storing the policy in a memory accessible by the host management module and the guest management module.

According to one embodiment, the receiving of the policy may include broadcasting, by the device management module, the received policy to one or more modules associated with the policy.

Figure 8:
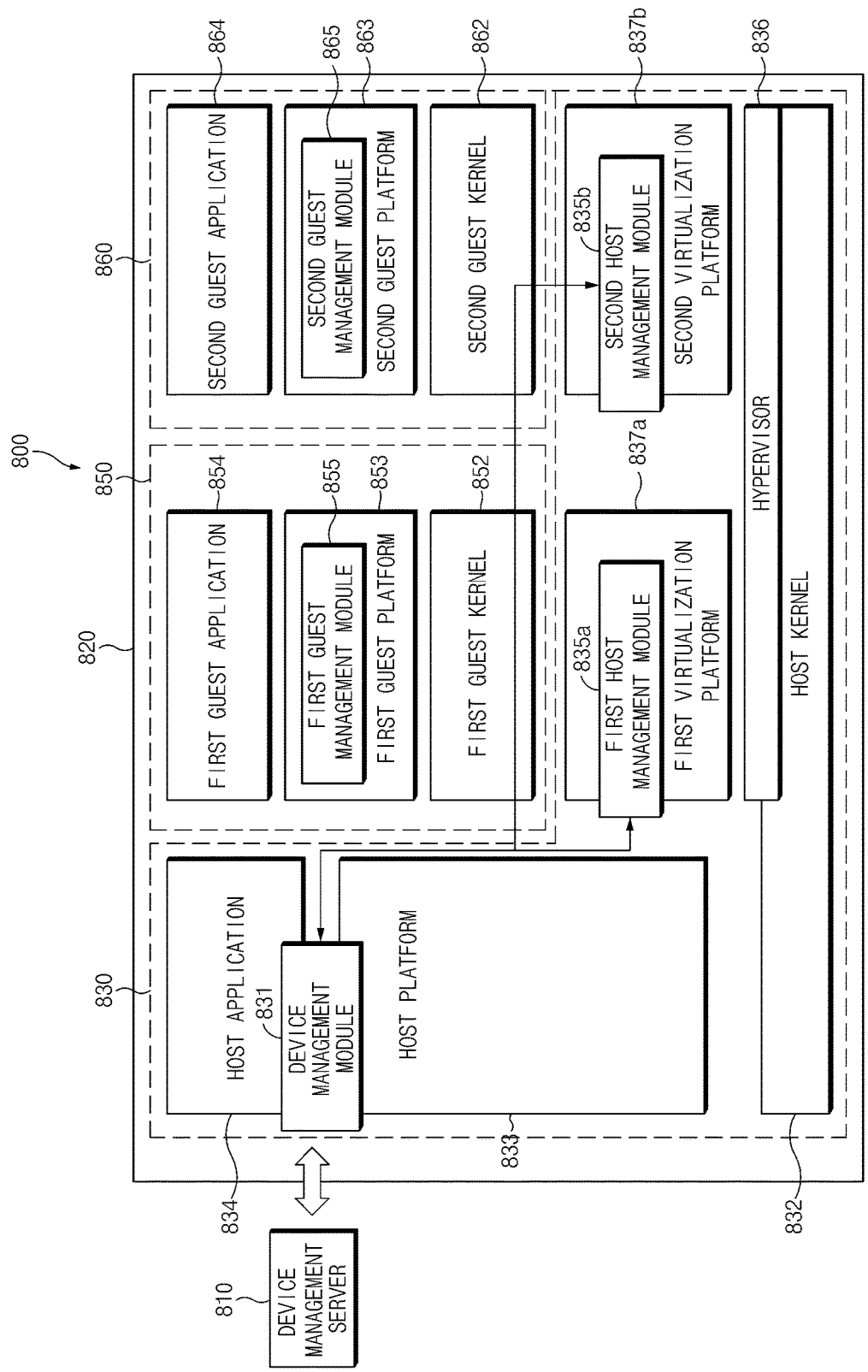
FIG. 8 is a configuration diagram for describing an electronic device including a plurality of guest operating systems, according to one embodiment of the present disclosure.

FIG. 8 is a configuration diagram for describing an electronic device including a plurality of operating systems, according to one embodiment of the present disclosure.

Referring to FIG. 8, a network environment 800 may include a device management server 810 and an electronic device 820.

The device management server 810 may provide a security policy for controlling functions executed on the electronic device 820 that operates a plurality of operating systems (e.g., a host operating system 830, a first guest operating system 850, and a second guest operating system 860). The device management server 810 may provide one operating system (e.g., the host operating system 830) with the security policy, but it may not provide a separate security policy to other operating systems (e.g., the first guest operating system 850 and the second guest operating system 860). If the security policy is provided to one operating system (e.g., the host operating system 830), the security policy may be sent to other operating systems (e.g., the first guest operating system 850 and the second guest operating system 860) through modules in the electronic device 820, and thus the security policy may be applied uniformly and efficiently.

According to an embodiment, if the security policy is provided to one operating system (e.g., the host operating system 830) that is operating in the electronic device 820, the security policy may be sent and applied to at least one of a plurality of guest operating systems (e.g., the first guest operating system 850 or the second guest operating system 860) through modules in the electronic device 820, such as the first and second host management modules 835a and 835b.

The electronic device 820 may run the host operating system 830, the first guest operating system 850, and the second guest operating system 860. The host operating system 830, the first guest operating system 850 and the second guest operating system 860 may operate independently of each other. The host operating system 830, the first guest operating system 850 and the second guest operating system 860 may be platforms for independent applications.

The host operating system 830 may include a device management module 831, a host kernel 832, a host platform 833, a host application 834, first and second host management modules 835a and 835b, the hypervisor 836, and first and second virtualization platforms 837a and 837b. Functions or operations of the device management module 831, the host kernel 832, the host platform 833, and the host application 834 may be the same as or similar to those of the device management module 231, the host kernel 232, the host platform 233, and the host application 234 illustrated in FIG. 2.

The host operating system 830 may be installed before the first guest operating system 850 and the second guest operating system 860 are installed. The hypervisor 836 may be operating based on a kernel 832 of the host operating system 830. The first guest operating system 850 and the second guest operating system 860 may be virtualized and driven through the hypervisor 836 (hypervisor type-2).

In FIG. 8, an embodiment is exemplified as the electronic device 820 includes two guest operating systems, that is, the first guest operating system 850 and the second guest operating system 860. However, embodiments of the present disclosure are not limited thereto. For example, embodiments may be applied to the case that an electronic device includes three or more guest operating systems. The host operating system 830 may be provided with a security policy from the device management server 810 and may control various devices or modules in the electronic device 820 and the execution of an application function. Furthermore, in the case where the security policy targets the first guest operating system 850 or the second guest operating system 860, the host operating system 830 may provide the security policy to each of the first and second guest operating systems 850 and 860.

The host operating system 830 may provide the received security policy to the first guest operating system 850 and the second guest operating system 860 by using the first host management module 835a and the second host management module 835b, respectively.

The first guest operating system 850 may include a first guest kernel 852, a first guest platform 853, a first guest application 854, and a first guest management module 855. The second guest operating system 860 may include a second guest kernel 862, a second guest platform 863, a second guest application 864, and a second guest management module 865. Elements included in each of the first guest operating system 850 and the second guest operating system 860 may perform functions that are the same as or similar to those included in the guest operating system 250 of FIG. 2.

A manner of applying a security policy to the first guest operating system 850 and the second guest operating system 860 may be the same as or similar to a manner of applying a security policy to the guest operating system 250 of FIG. 2. The host operating system 830 may independently apply a security policy to the first guest operating system 850 and the second guest operating system 860.

Figure 9:
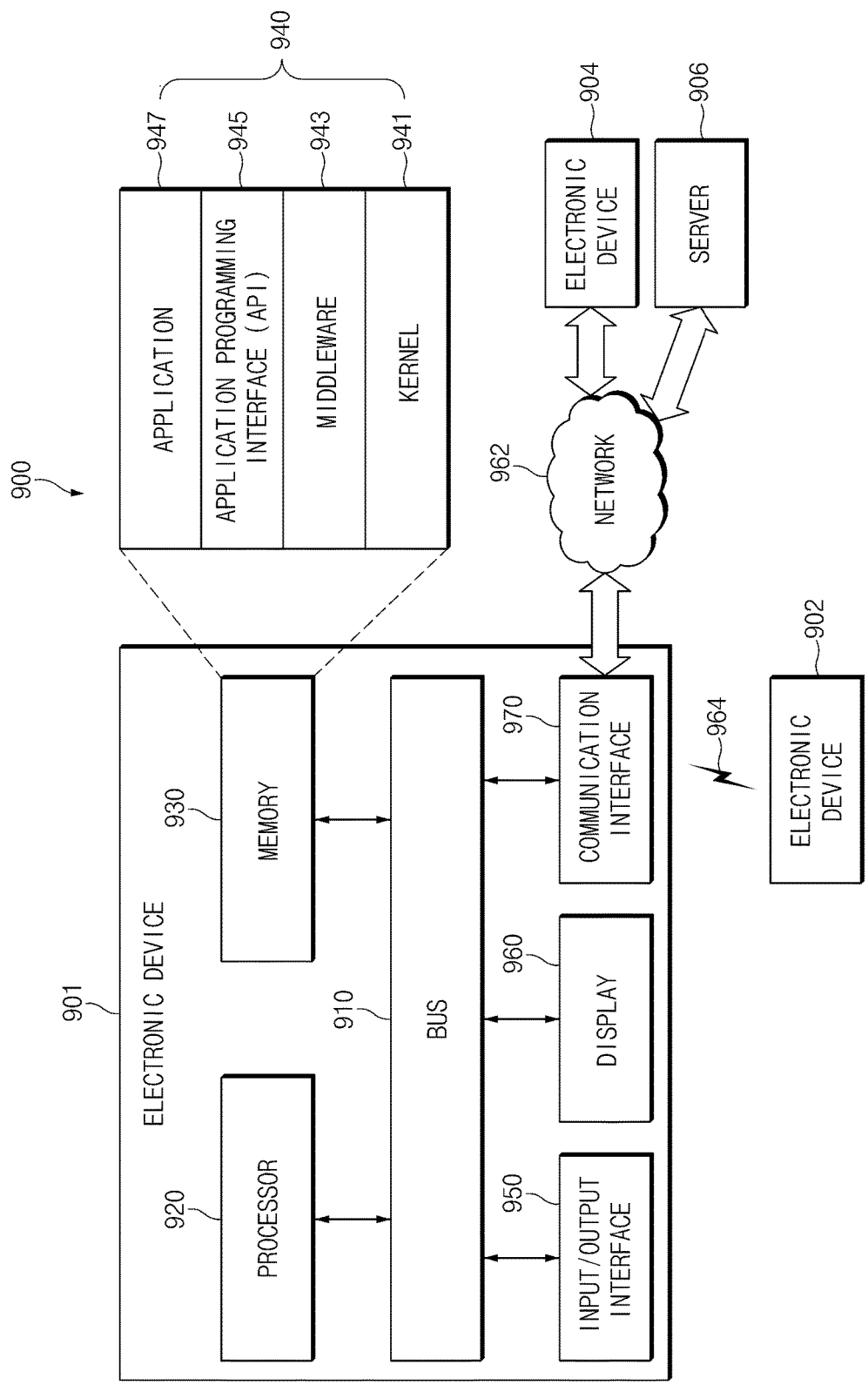
FIG. 9 is a diagram illustrating an electronic device in a network environment, according to various embodiments of the present disclosure.

FIG. 9 is a diagram illustrating an electronic device in a network environment, according to various embodiments of the present disclosure.

Referring to FIG. 9, there is illustrated an electronic device 901 in a network environment 900 according to various embodiments. The electronic device 901 may include a bus 910, a processor 920, a memory 930, an input/output (I/O) interface 950, a display 960, and a communication interface 970. According to an embodiment, the electronic device 901 may not include at least one of the above-described elements or may further include other element(s).

For example, the bus 910 may interconnect the above-described elements 920 to 970 and may include a circuit for conveying communications (e.g., a control message and/or data) among the above-described elements.

The processor 920 (e.g., the processor 110 of FIG. 1) may include one or more of a central processing unit (CPU), an application processor (AP), or a communication processor (CP). The processor 920 may perform, for example, data processing or an operation associated with control and/or communication of at least one other element(s) of the electronic device 901. An artisan understands and appreciates that a "processor" or "microprocessor" constitute hardware in the claimed invention. Under the broadest reasonable interpretation, the appended claims constitute statutory subject matter in compliance with 35 U.S.C. § 101. In addition, a processor as described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 930 (e.g., the memory 160 of FIG. 1) may include a volatile and/or nonvolatile memory. For example, the memory 930 may store instructions or data associated with at least one other element(s) of the electronic device 901. According to an embodiment, the memory 930 may store software and/or a program 940. The program 940 may include, for example, a kernel 941, a middleware 943, an application programming interface (API) 945, and/or an application program (or "application") 947. At least a part of the kernel 941, the middleware 943, or the API 945 may be called an "operating system (OS)".

The kernel 941 may control or manage system resources (e.g., the bus 910, the processor 920, the memory 930, and/or other hardware and software resources) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform a mediation role such that the API 945 or the application program 947 communicates with the kernel 941 to exchange data.

Furthermore, the middleware 943 may process one or more task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be an interface through which the application 947 controls a function provided by the kernel 941 or the middleware 943, and may include, for example, at least one interface or function (e.g., an instruction) for a file control, a window control, image processing, a character control, or the like.

The I/O interface 950 may transmit an instruction or data, input from a user or another external device, to other element(s) of the electronic device 901. Furthermore, the I/O interface 950 may output an instruction or data, received from other element(s) of the electronic device 901, to a user or another external device.

The display 960 may include, for example, a liquid crystal display (LCD), a light-emitting diode (LED) display, an organic LED (OLED) display, or a microelectromechanical systems (MEMS) display, or an electronic paper display. The display 960 may display, for example, various kinds of content (e.g., a text, an image, a video, an icon, a symbol, and the like) to a user. The display 960 may include a touch screen and may receive, for example, a touch, gesture, proximity, or hovering input using an electronic pen or a portion of a user's body using capacitive, resistive, or another type of technology.

The communication interface 970 may establish communication between the electronic device 901 and an external device (e.g., a first external electronic device 902, a second external electronic device 904, or a server 906). For example, the communication interface 970 may be connected to a network 962 through wireless communication or wired communication to communicate with an external device (e.g., the second external electronic device 904 or the server 906).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 964. The local area network 964 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second external electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the external electronic devices 902 and 904 or the server 906). According to an embodiment, in the case where the electronic device 901 executes any function or service automatically or in response to a request, the electronic device 901 may not perform the function or the service internally, but, alternatively additionally, it may request at least a part of a function associated with the electronic device 101 at other device (e.g., the external electronic device 902 or 904 or the server 906). The other electronic device (e.g., the external electronic device 902 or 904 or the server 906) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
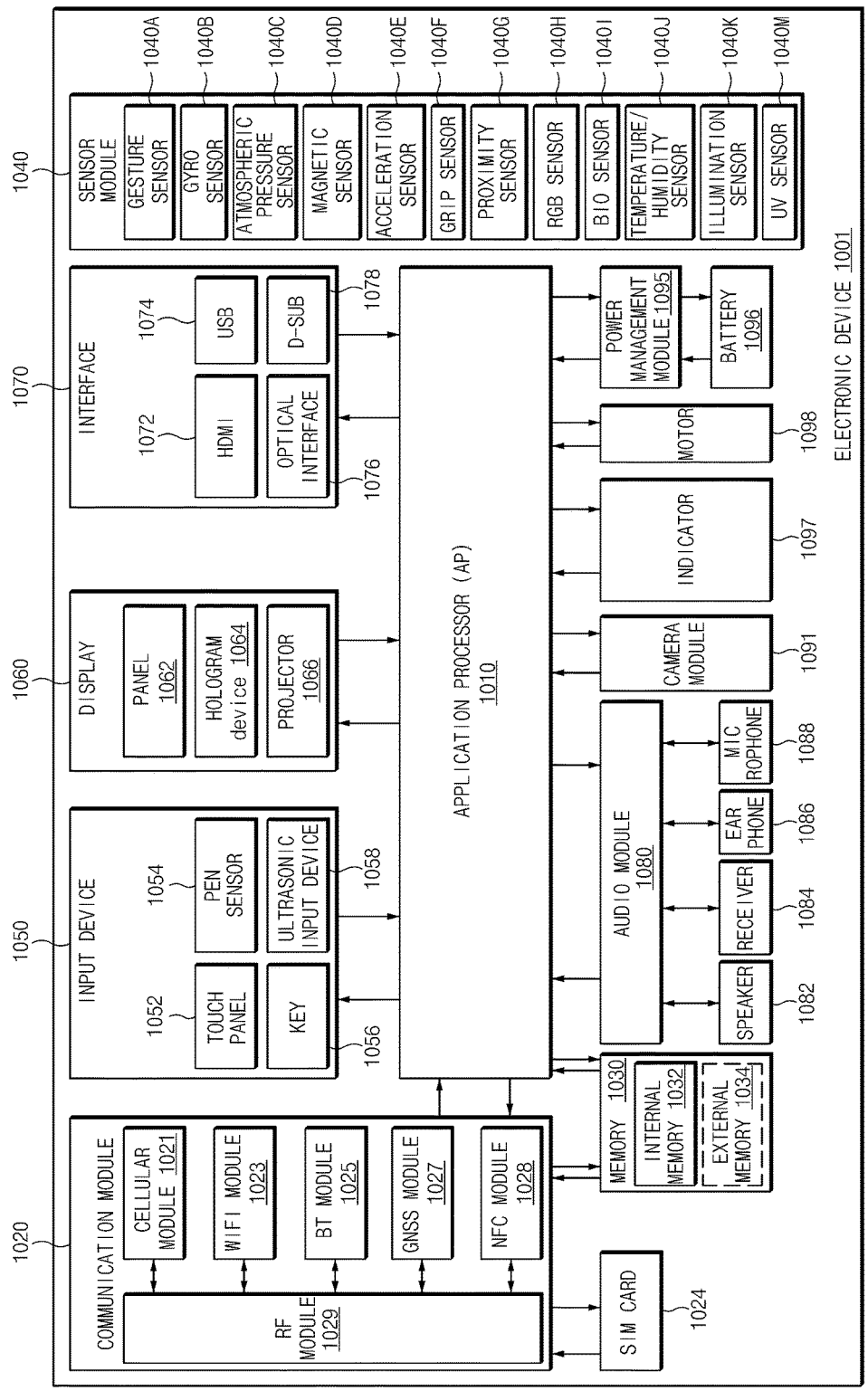
FIG. 10 is a block diagram of an electronic device according to various embodiments of the present disclosure.

FIG. 10 is a block diagram of an electronic device according to various embodiments of the present disclosure. An electronic device 1001 may include, for example, all or a part of the electronic device 101 illustrated in FIG. 1. The electronic device 1001 may include one or more processors (e.g., an application processor (AP)) 1010, a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098. The terms "unit" or "module" referred to herein may be understood as comprising hardware such as a processor or microprocessor configured for a certain desired functionality, or a non-transitory medium comprising machine executable code, in accordance with statutory subject matter under 35 U.S.C. § 101 and does not constitute only software per se.

The processor 1010 may drive an operating system (OS) or an application to control a plurality of hardware or software elements connected to the processor 1010 and may process and compute a variety of data. The processor 1010 may be implemented with a System on Chip (SoC), for example. According to an embodiment, the processor 1010 may further include a graphic processing unit (GPU) and/or an image signal processor. The processor 1010 may include at least a part (e.g., a cellular module 1021) of elements illustrated in FIG. 10. The processor 1010 may load and process an instruction or data, which is received from at least one of other elements (e.g., a nonvolatile memory) and may store a variety of data in a nonvolatile memory.

The communication module 1020 may be configured the same as or similar to the communication interface 970 of FIG. 9. The communication module 1020 may include a cellular module 1021, a Wi-Fi module 1023, a Bluetooth (BT) module 1025, a GNSS module 1027 (e.g., a GPS module, a Glonass module, a Beidou module, or a Galileo module), a near field communication (NFC) module 1028, and a radio frequency (RF) module 1029.

The cellular module 1021 may provide voice communication, video communication, a message service, an Internet service or the like through a communication network. According to an embodiment, the cellular module 1021 may perform discrimination and authentication of the electronic device 1001 within a communication network using the subscriber identification module 1024 (e.g., a SIM card), for example. According to an embodiment, the cellular module 1021 may perform at least a portion of functions that the processor 1010 provides. According to an embodiment, the cellular module 1021 may include a communication processor (CP).

Each of the Wi-Fi module 1023, the BT module 1025, the GNSS module 1027, and the NFC module 1028 may include a processor for processing data exchanged through a corresponding module, for example. According to an embodiment, at least a part (e.g., two or more elements) of the cellular module 1021, the Wi-Fi module 1023, the BT module 1025, the GNSS module 1027, or the NFC module 1028 may be included within one Integrated Circuit (IC) or an IC package.

The RF module 1029 may transmit and receive, for example, a communication signal (e.g., an RF signal). The RF module 1029 may include, for example, a transceiver, a power amplifier module (PAM), a frequency filter, a low noise amplifier (LNA), an antenna, or the like. According to another embodiment, at least one of the cellular module 1021, the Wi-Fi module 1023, the BT module 1025, the GNSS module 1027, or the NFC module 1028 may transmit and receive an RF signal through a separate RF module.

The subscriber identification module 1024 may include, for example, a card and/or embedded SIM that includes a subscriber identification module and may include unique identify information (e.g., integrated circuit card identifier (ICCID)) or subscriber information (e.g., international mobile subscriber identity (IMS The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1034 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1034 may be functionally and/or physically connected with the electronic device 1001 through various interfaces.

The sensor module 1040 may measure, for example, a physical quantity or may detect an operation state of the electronic device 1001. The sensor module 1040 may convert the measured or detected information to an electric signal. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Even though not illustrated, additionally or alternatively, the sensor module 1040 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor which is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input device 1058. The touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a portion of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, or a projector 1066. The panel 1062 may be configured the same as or similar to the display 960 of FIG. 9. The panel 1062 may be implemented to be flexible, transparent or wearable, for example.

The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged inside or outside the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or alternatively, the interface 1070 may include, for example, a mobile high definition link (MHL) interface, a SD card/multi-media card (MMC) interface, or an infrared data association (IrDA) standard interface.

The audio module 1080 may convert a sound and an electrical signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or a microphone 1088.

The camera module 1091 for shooting a still image or a video may include, for example, at least one image sensor (e.g., a front sensor or a rear sensor), a lens, an image signal processor (ISP), or a flash (e.g., an LED or a xenon lamp).

The power management module 1095 may manage, for example, power of the electronic device 1001. According to an embodiment, a power management integrated circuit (PMIC) a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1096 and a voltage, current or temperature thereof while the battery is charged. The battery 1096 may include, for example, a rechargeable battery or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate a vibration effect, a haptic effect, or the like. Even though not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

According to one embodiment, an electronic device includes a first operating system and a second operating system where the first operating system includes a device management module and a host management module, the second operating system operates in a virtual environment supported by a hypervisor installed on a kernel of the first operating system, the device management module receives a policy for the first or second operating system from an external server, the device management module sends the policy to the host management module in communication with the second operating system, and the host management module applies the policy to the second operating system.

According to one embodiment, the host management module sets a device driver coupled to a virtual device driver of the second operating system when the policy applies to a hardware device of the electronic device.

According to one embodiment, the second operating system further comprises a guest management module and a system control module, and the host management module provides at least a part of the policy to the guest management module when the policy applies to a software control of the second operating system.

According to one embodiment, the host management module controls a backend device driver of the hypervisor. The backend device driver notifies a frontend device driver of the second operating system corresponding to the backend device driver that a hardware device of the electronic device is removed or is in an disabled state. The frontend device driver notifies a virtual device driver of the second operating system that the hardware device of the electronic device is removed or is in an disabled state.

According to one embodiment, the guest management module converts at least a part of the policy and provides the converted policy to the system control module, and the system control module applies the converted policy to the second operating system.

According to one embodiment, a computer-readable recording medium having recorded thereon a program for executing a method including receiving a policy from an external server by a device management module of a first operating system of an electronic device, wherein the policy is for the first operating system or a second operating system of the electronic device, sending, by the device management module, the policy to a host management module of the first operating system in communication with the second operating system; and applying, by the host management module, the policy to the second operating system.

Figure 11:
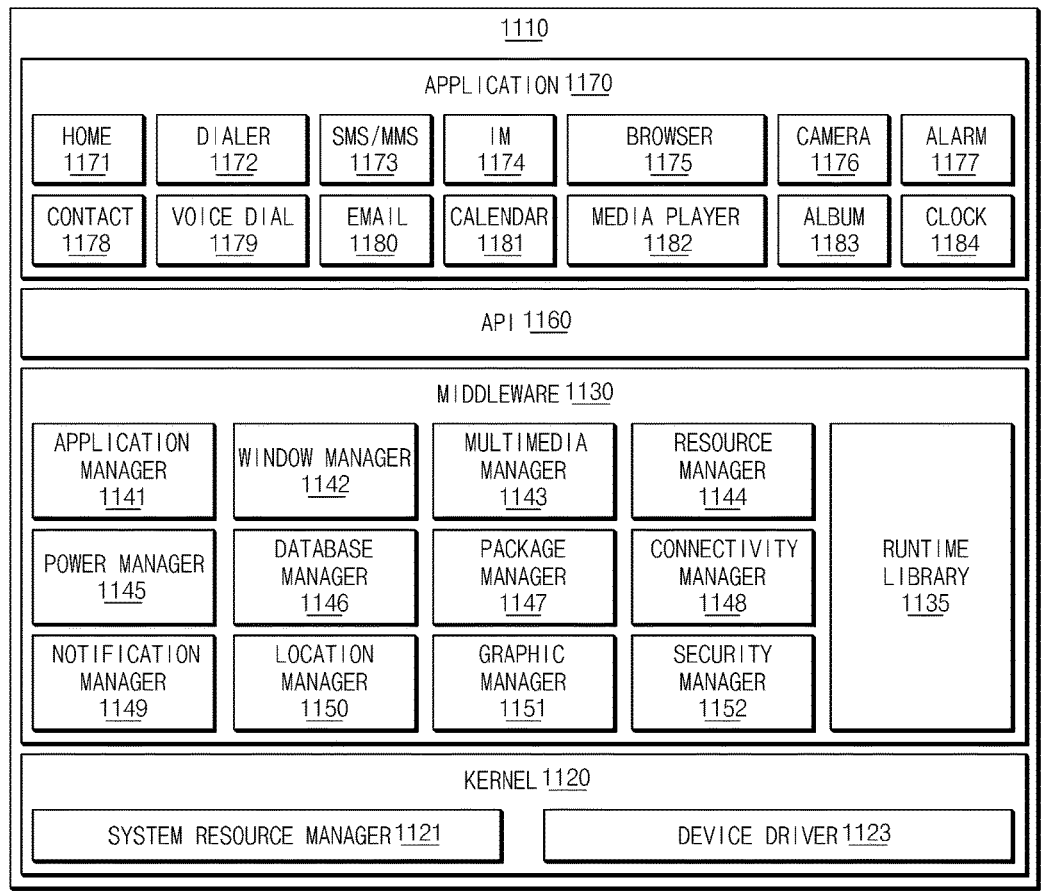
FIG. 11 is a block diagram of a program module according to various embodiments of the present disclosure.

FIG. 11 is a block diagram of a program module according to various embodiments of the present disclosure. According to an embodiment, a program module 1110 (e.g., the program 940) may include an operating system (OS) to control resources associated with an electronic device (e.g., the electronic device 901) and/or diverse applications (e.g., the application program 947) driven on the OS. The OS may be, for example, android, iOS, windows, symbian, tizen, or bada.

The program module 1110 may include a kernel 1120, a middleware 1130, an application programming interface (API) 1160, and/or an application 1170. At least a part of the program module 1110 may be preloaded on an electronic device or may be downloadable from an external electronic device (e.g., the external device 902, and the like).

The kernel 1120 (e.g., the kernel 941) may include, for example, a system resource manager 1121 and/or a device driver 1123. The system resource manager 1121 may perform control, allocation, or retrieval of system resources. According to an embodiment, the system resource manager 1121 may include a process managing part, a memory managing part, or a file system managing part. The device driver 1123 may include, for example, a display driver, a camera driver, a Bluetooth driver, a shared memory driver, an USB driver, a keypad driver, a Wi-Fi driver, an audio driver, or an inter-process communication (IPC) driver.

The middleware 1130 may provide, for example, a function which the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, or a security manager 1152.

The runtime library 1135 may include, for example, a library module which is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a GUI resource which is used in a screen. The multimedia manager 1143 may identify a format necessary for playing diverse media files and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power and may provide power information for an operation of an electronic device. The database manager 1146 may generate, search for, or modify database which is to be used in at least one application of the application 1170. The package manager 1147 may install or update an application which is distributed in the form of a package file.

The connectivity manager 1148 may manage, for example, wireless connection such as Wi-Fi or Bluetooth. The notification manager 1149 may display or notify an event such as arrival message, appointment, or proximity notification in a mode that does not disturb a user. The location manager 1150 may manage location information of an electronic device. The graphic manager 1151 may manage a graphic effect that is provided to a user or manage a user interface relevant thereto. The security manager 1152 may provide a general security function necessary for system security or user authentication. According to an embodiment, in the case where an electronic device (e.g., the electronic device 901) includes a telephony function, the middleware 1130 may further includes a telephony manager for managing a voice or video call function of the electronic device.

The middleware 1130 may include a middleware module that combines diverse functions of the above-described elements. The middleware 1130 may provide a module specialized to each OS kind to provide differentiated functions. Additionally, the middleware 1130 may remove a part of the preexisting elements, dynamically, or may add a new element thereto.

The API 1160 (e.g., the API 945) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, and a clock 1184, or for offering health care (e.g., measuring an exercise quantity or blood sugar) or environment information (e.g., atmospheric pressure, humidity, or temperature).

According to an embodiment, the application 1170 may include an application (hereinafter referred to as "information exchanging application" for descriptive convenience) to support information exchange between the electronic device (e.g., the electronic device 901) and an external electronic device (e.g., the external electronic device 902 or 904). The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the external electronic device 902 or 904). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of an external electronic device (e.g., the external electronic device 902) which communicates with the electronic device, an application running in the external electronic device, or a service (e.g., a call service, a message service, or the like) provided from the external electronic device.

According to an embodiment, the application 1170 may include an application (e.g., a health care application of a mobile medical device, and the like) which is assigned in accordance with an attribute of the external electronic device (e.g., the external electronic device 902). According to an embodiment, the application 1170 may include an application which is received from an external electronic device (e.g., the external electronic device 902). According to an embodiment, the application 1170 may include a preloaded application or a third party application which is downloadable from a server. The element titles of the program module 1110 according to the embodiment may be modifiable depending on kinds of OSs.

According to various embodiments, at least a part of the program module 1110 may be implemented by software, firmware, hardware, or a combination of two or more thereof. At least a portion of the program module 1110 may be implemented (e.g., executed), for example, by the processor (e.g., the processor 920). At least a portion of the program module 1110 may include, for example, a module, a program, a routine, sets of instructions, or a process for performing one or more functions.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to an embodiment of the present invention, a device management method and an electronic device supporting the same may receive a security policy from an external device through one operating system to provide the security policy to any other operating system(s), thereby making it possible to perform uniform, unified security management.

Also, the device management method and the electronic device supporting the same may manage a security policy in the plurality of operating systems, thereby simplifying a system configuration.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:
1. A device management method comprising:
receiving, at an electronic device including a first operating system and a second operating system, a policy for the first or second operation system from an external server by a device management module of the first operating system, the policy being applied in the first operation system for security;
sending, by the device management module, the policy to a host management module of the first operating system in communication with the second operating system; and
applying, by the host management module, the policy to the second operating system,
wherein the applying includes converting, by a second management module included in the second operation system, the policy into a form suitable for a security of the second operating system,
wherein applying the policy to the second operating system comprises:

controlling, by the host management module, a backend device driver of a hypervisor installed on a kernel of the first operating system,
    notifying, by the backend device driver, a frontend device driver corresponding to the backend device driver that a hardware device of the electronic device is removed or is in a disabled state, and
    notifying, by the frontend device driver, a virtual device driver of the second operating system that the hardware device of the electronic device is removed or is in a disabled state.

2. The device management method of claim 1, wherein applying the policy to the second operating system further comprises:
    when the policy applies to a hardware device of the electronic device, setting, by the host management module, a device driver coupled to a virtual device driver of the second operating system.

3. The device management method of claim 2, wherein setting the device driver comprises:
    restricting, by the host management module, a function of the virtual device driver of the second operating system through a hypervisor installed on a kernel of the first operating system.

4. The device management method of claim 2, wherein setting the device driver comprises:
    automatically switching the virtual device driver into a disabled state when a corresponding device driver of the first operating system is switched into the disabled state.

5. The device management method of claim 1, wherein applying the policy to the second operating system comprises:
    when the policy applies to a software control of the second operating system, providing, by the host management module, at least a part of the policy to a guest management module in the second operating system.

6. The device management method of claim 5, further comprising:
    converting, by the guest management module, the at least a part of the policy; and
    applying the converted policy by a system control module in the second operating system.

7. The device management method of claim 6, wherein converting the at least a part of the policy comprises:
    mapping, by the guest management module, the at least a part of the policy into a command or application programming interface (API) call of the second operating system and providing a result of the mapping to the system control module in the second operating system.

8. The device management method of claim 5, wherein the providing of the at least a part of the policy comprises:
    storing the policy in a memory accessible by the host management module and the guest management module.

9. The device management method of claim 1, wherein receiving the policy comprises:
    broadcasting, by the device management module, the received policy to one or more modules associated with the policy.

10. An electronic device comprising:
    a non-transitory computer readable medium comprising a first operating system and a second operating system; wherein:
    the first operating system includes a device management module and a host management module,
    the second operating system includes a second management module and operates in a virtual environment supported by a hypervisor installed on a kernel of the first operating system,
    the device management module receives a policy for the first or second operating system from an external server, the policy being applied in the first operating system for security,
    the device management module sends the policy to the host management module in communication with the second operating system,
    the host management module applies the policy to the second operating system,
    the second management module converts the policy into a form suitable for a security of the second operating system,
    the host management module controls a backend device driver of the hypervisor,
    the backend device driver notifies a frontend device driver of the second operating system corresponding to the backend device driver that a hardware device of the electronic device is removed or is in an disabled state, and
    the frontend device driver notifies a virtual device driver of the second operating system that the hardware device of the electronic device is removed or is in an disabled state.

11. The electronic device of claim 10, wherein the host management module sets a device driver coupled to the virtual device driver of the second operating system when the policy applies to the hardware device of the electronic device.

12. The electronic device of claim 10, wherein the second operating system comprises a guest management module and a system control module, and
    the host management module provides at least a part of the policy to the guest management module when the policy applies to a software control of the second operating system.

13. The electronic device of claim 12, wherein the guest management module converts at least a part of the policy and provides the converted policy to the system control module, and
    the system control module applies the converted policy to the second operating system.

14. A computer-readable recording medium having recorded thereon a program for executing a method comprising:
    receiving a policy from an external server by a device management module of a first operating system of an electronic device, wherein the policy is for the first operating system or a second operating system of the electronic device, the policy being applied in the first operation system for security;
    sending, by the device management module, the policy to a host management module of the first operating system in communication with the second operating system; and
    applying, by the host management module, the policy to the second operating system,
    wherein the applying includes converting, by a second management module included in the second operating system, the policy into a form suitable for a security of the second operating system,
    wherein applying the policy to the second operating system comprises:

controlling, by the host management module, a backend device driver of a hypervisor installed on a kernel of the first operating system, notifying, by the backend device driver, a frontend device driver corresponding to the backend device driver that a hardware device of the electronic device is removed or is in a disabled state, and notifying, by the frontend device driver, a virtual device driver of the second operating system that the hardware device of the electronic device is removed or is in a disabled state.

* * * * *